United States Patent
Lee et al.

(10) Patent No.: US 11,557,438 B2
(45) Date of Patent: Jan. 17, 2023

(54) MULTILAYER CAPACITOR

(71) Applicant: SAMSUNG ELECTRO-MECHANICS CO., LTD., Suwon-si (KR)

(72) Inventors: Jong Ho Lee, Suwon-si (KR); Chang Ho Seo, Suwon-si (KR); Eun Jung Lee, Suwon-si (KR); Myung Chan Son, Suwon-si (KR); Jung Tae Park, Suwon-si (KR); Chang Soo Park, Suwon-si (KR); Min Woo Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/222,499

(22) Filed: Apr. 5, 2021

(65) Prior Publication Data

US 2022/0130612 A1    Apr. 28, 2022

(30) Foreign Application Priority Data

Oct. 28, 2020   (KR) ......................... 10-2020-0141057

(51) Int. Cl.
*H01G 4/30*  (2006.01)
*H01G 4/12*  (2006.01)
(Continued)

(52) U.S. Cl.
CPC ............... *H01G 4/30* (2013.01); *H01G 4/008* (2013.01); *H01G 4/012* (2013.01); *H01G 4/1209* (2013.01)

(58) Field of Classification Search
CPC .......... H01G 4/30; H01G 4/012; H01G 4/008; H01G 4/1209
(Continued)

(56) References Cited

U.S. PATENT DOCUMENTS

| 10,109,425 B2* | 10/2018 | Kim ...................... H01G 4/232 |
| 2004/0027787 A1* | 2/2004 | Yamauchi .............. H01G 4/012 |
| | | 361/321.2 |

(Continued)

FOREIGN PATENT DOCUMENTS

| JP | 2019-125705 A | 7/2019 |
| KR | 10-1963284 B1 | 3/2019 |

*Primary Examiner* — Arun Ramaswamy
(74) *Attorney, Agent, or Firm* — Morgan, Lewis & Bockius LLP (57) ABSTRACT

A multilayer capacitor includes a body including a multilayer structure in which a plurality of dielectric layers are stacked, and further including a plurality of internal electrodes having a dielectric layer interposed therebetween and external electrodes disposed on external surfaces of the body and connected to the internal electrodes. The body further includes an active portion in which the plurality of internal electrodes are located to form capacitance and a side margin portion covering a first surface and a second surface of the active portion opposing each other. An average grain size of a dielectric layer included in the active portion is different from an average grain size of a dielectric layer included in the margin portion. The side margin portion includes an extending portion extending between the external electrodes and the internal electrodes to cover a portion of the internal electrodes.

19 Claims, 9 Drawing Sheets

(51) Int. Cl.
*H01G 4/012* (2006.01)
*H01G 4/008* (2006.01)

(58) Field of Classification Search
USPC ..... 361/311, 321.5, 303, 301.4, 321.2, 321.3
See application file for complete search history.

(56) References Cited

U.S. PATENT DOCUMENTS

| | | | |
|---|---|---|---|
| 2012/0073129 A1* | 3/2012 | Abe | H01G 4/30 |
| | | | 29/825 |
| 2014/0301013 A1* | 10/2014 | Kim | H01G 4/01 |
| | | | 29/25.03 |
| 2018/0233286 A1 | 8/2018 | Yu et al. | |
| 2019/0221368 A1 | 7/2019 | Ono et al. | |

* cited by examiner

MULTILAYER CAPACITOR

CROSS-REFERENCE TO RELATED APPLICATION

The present application claims the benefit of priority to Korean Patent Application No. 10-2020-0141057, filed on Oct. 28, 2020 in the Korean Intellectual Property Office, the disclosure of which is incorporated herein by reference in its entirety.

TECHNICAL FIELD

The present disclosure relates to a multilayer capacitor.

BACKGROUND

A capacitor is a device capable of storing electricity which is based on a principle that electricity is generally accumulated in each of two facing electrodes when a voltage is applied thereto. When a direct current (DC) voltage is applied, current flows in the capacitor, while electricity is accumulated therein, and when accumulating is completed, no current flows. Meanwhile, when an alternating current (AC) voltage is applied, AC current flows, while polarities of electrodes alternate.

Capacitors may be classified into various types such as an aluminum electrolytic capacitor in which electrodes are formed of aluminum and a thin oxide film is provided between the aluminum electrodes, a tantalum capacitor using tantalum as a material of electrodes, a ceramic capacitor using a high-k dielectric material such as titanium, barium, or the like, between electrodes, a multilayer ceramic capacitor (MLCC) using a multilayer structure of high-k ceramics as a dielectric material provided between electrodes, a film capacitor using a polystyrene film as a dielectric material between electrodes, and the like.

Among the capacitors, the MLCC advantageously has excellent temperature characteristics and frequency characteristics, may be implemented in a small size, and thus has been widely applied in various fields such as high-frequency circuits. In recent years, attempts to implement a smaller multilayer ceramic capacitor have continued, and to this end, a dielectric layer and an internal electrode are formed to be thin. However, as components are reduced in size, there is a limit to increasing the number of stacked internal electrodes, and thus, it is difficult to secure an intended level of capacitance.

Recently, many attempts have been made to reduce moisture resistance reliability and cracks caused due to occurrence of stress during board mounting.

SUMMARY

An aspect of the present disclosure may provide a multilayer capacitor capable of improving reliability (e.g., moisture resistance reliability) against an external influence.

According to an aspect of the present disclosure, a multilayer capacitor may include: a body including a multilayer structure in which a plurality of dielectric layers are stacked, and further including a plurality of internal electrodes having a dielectric layer interposed therebetween; and external electrodes disposed on external surfaces of the body and connected to the internal electrodes. The body further includes an active portion in which the plurality of internal electrodes are located to form capacitance and a side margin portion covering a first surface and a second surface of the active portion facing each other. An average grain size of a dielectric layer included in the active portion is different from an average grain size of a dielectric layer included in the side margin portion. The side margin portion includes an extending portion extending between the external electrodes and the internal electrodes to cover a portion of the internal electrodes.

The average grain size of the dielectric layer included in the active portion may be larger than the average grain size of the dielectric layer included in the side margin portion.

The side margin portion may not cover two surfaces of the body facing in a direction in which the plurality of dielectric layers are stacked.

Lengths of exposed regions of the plurality of internal electrodes not covered by the extended portion may be substantially uniform in a direction in which the first and second surfaces of the active portion oppose each other.

Each length of the exposed regions may be 50% or greater of a length of the body in a direction in which the first and second surfaces of the active portion oppose each other.

A direction in which the plurality of dielectric layers are stacked is a first direction and a direction in which the first and second surfaces oppose is a second direction, and the internal electrodes may be exposed from the body and connected to the external electrodes in a third direction perpendicular to the first direction and the second direction.

Based on a cut surface of the body cut in the first and second directions, the average grain size of the dielectric layer included in the active portion may be an average size of grains present in a first rectangle including a center point of the active portion in the cut surface and having a length equal to half a length of the body in the first direction and a width equal to half a length of the active portion in the second direction.

The average grain size of the dielectric layer included in the side margin portion may be an average size of grains present in a second rectangle including a center point of the side margin portion in the cut surface and having a length equal to half a length of the side margin portion in the first direction and a width equal to half a length of the side margin portion in the second direction.

Each of the external electrodes may include a first layer in contact with the internal electrode and a second layer covering the first layer.

The first layer of each of the external electrodes may cover a surface of the body to which the internal electrodes are exposed and extend to cover the side margin portion and two surfaces of the body facing in a direction in which the plurality of dielectric layers are stacked.

The first layers of the external electrodes may cover the external surfaces of the body, respectively, to which the internal electrodes are exposed and do not cover surfaces of the body other than the external surfaces of the body.

The average grain size of the dielectric layer included in the extending portion of the side margin portion may be smaller than the average grain size of the dielectric layer included in the active portion.

A thickness of the extending portion in a direction in which the internal electrodes are exposed from the body may be substantially the same as a thickness of remaining regions of the side margin portion in a direction in which the first and second surfaces of the active portion oppose each other.

According to another aspect of the present disclosure, a multilayer capacitor may include: a body including a multilayer structure in which a plurality of dielectric layers are stacked, and further including a plurality of internal electrodes having a dielectric layer interposed therebetween; and external electrodes disposed on external surfaces of the body and connected to the internal electrodes. The body further includes an active portion in which the plurality of internal electrodes are located to form capacitance and a side margin portion covering a first surface and a second surface of the active portion opposing each other. The side margin portion includes an extending portion extending between the external electrodes and the internal electrodes to cover a portion of the internal electrodes. Two surfaces of the body opposing in a direction in which the plurality of dielectric layers are stacked are free from the extending portion.

Lengths of exposed regions of the plurality of internal electrodes not covered by the extended portion may be substantially uniform in a direction in which the first and second surfaces of the active portion oppose each other.

An average grain size of a dielectric layer included in the active portion may be larger than an average grain size of a dielectric layer included in the side margin portion.

An average grain size of a dielectric layer included in the extending portion of the side margin portion may be smaller than an average grain size of a dielectric layer included in the active portion.

Lengths of exposed regions of the plurality of internal electrodes not covered by the extended portion may be substantially uniform in a direction in which the first and second surfaces of the active portion oppose each other.

The lengths of the exposed regions of the plurality of internal electrodes may be narrowed from a width of the active portion measured from the first surface to the second surface of the active portion.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
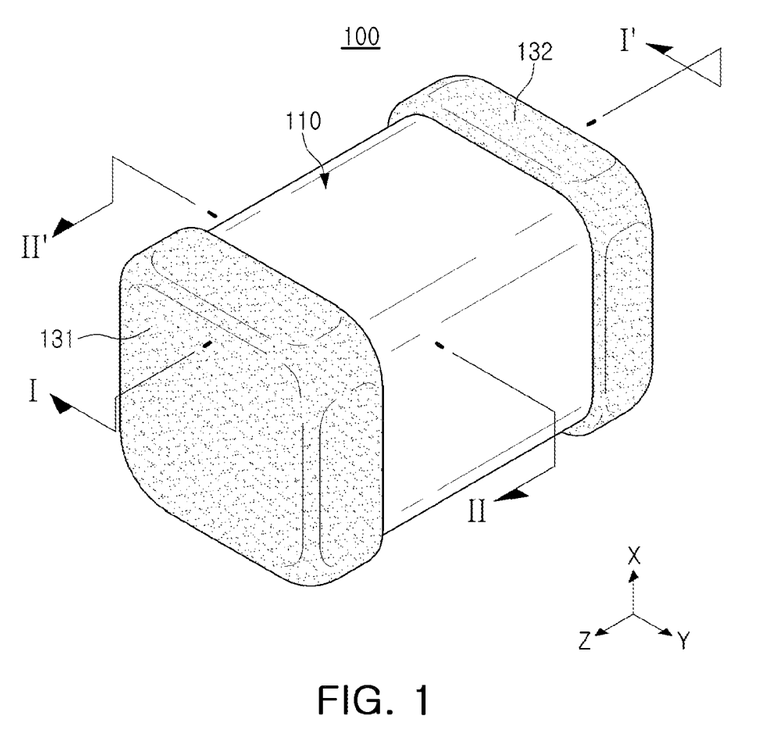
FIG. 1 is a perspective view schematically showing an appearance of a multilayer capacitor according to an exemplary embodiment in the present disclosure.
Figure 2:
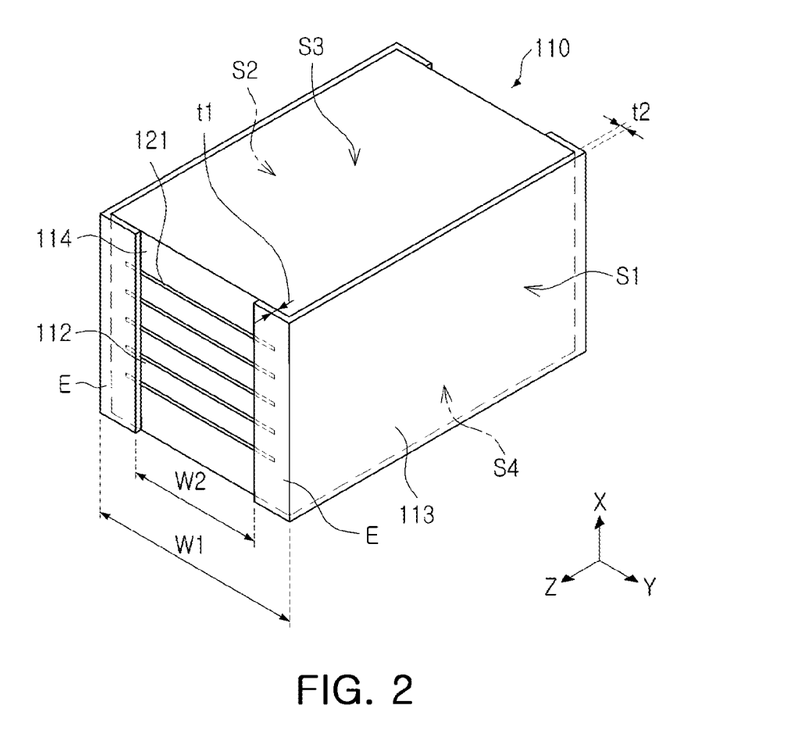
FIG. 2 shows a shape of a body in the multilayer capacitor of FIG. 1.
Figure 3:
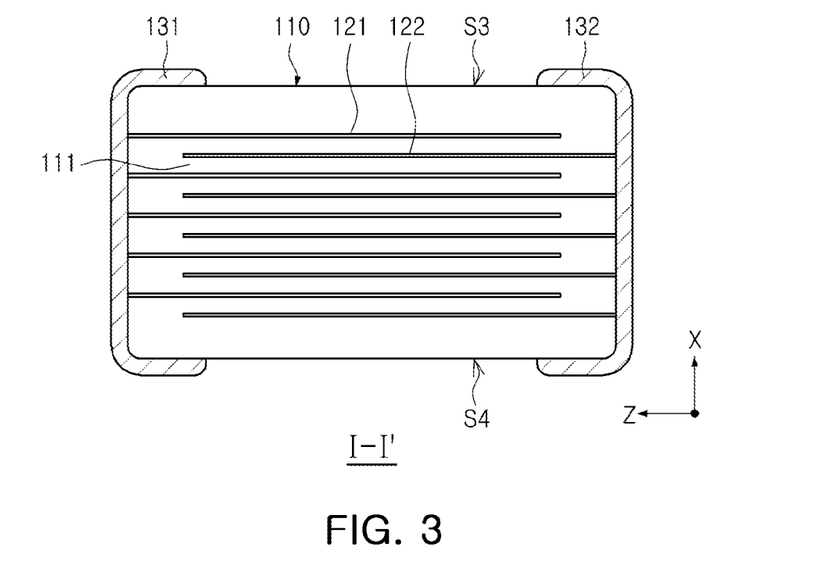
FIG. 3 is a cross-sectional view of the multilayer capacitor of FIG. 1, taken along line I-I'.
Figure 4:
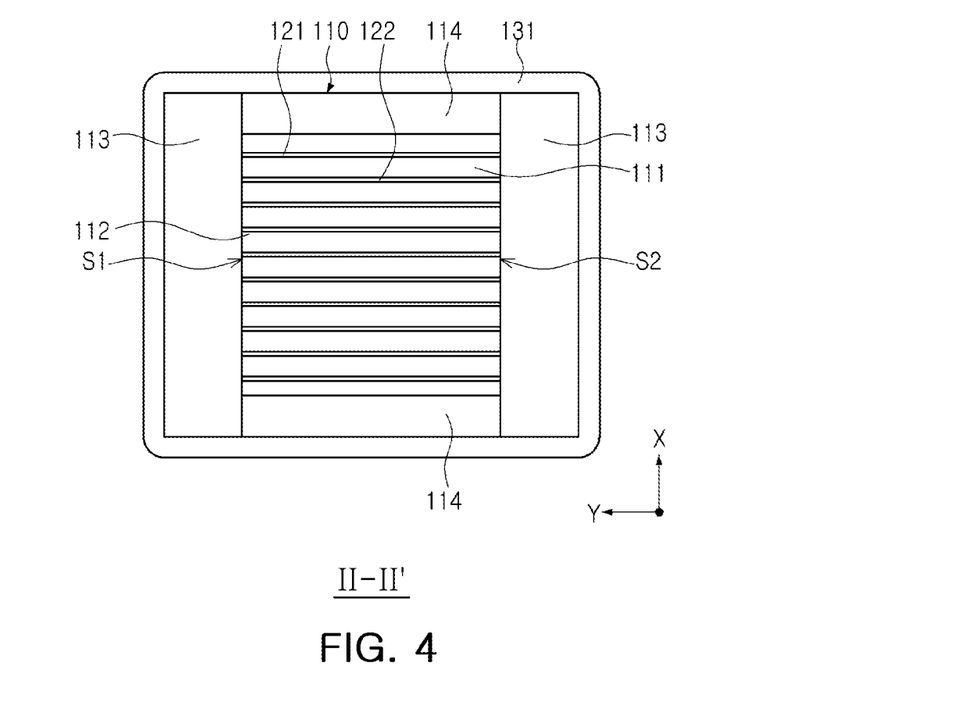
FIG. 4 is a cross-sectional view of the multilayer capacitor of FIG. 1, taken along line II-II'.
Figure 5:
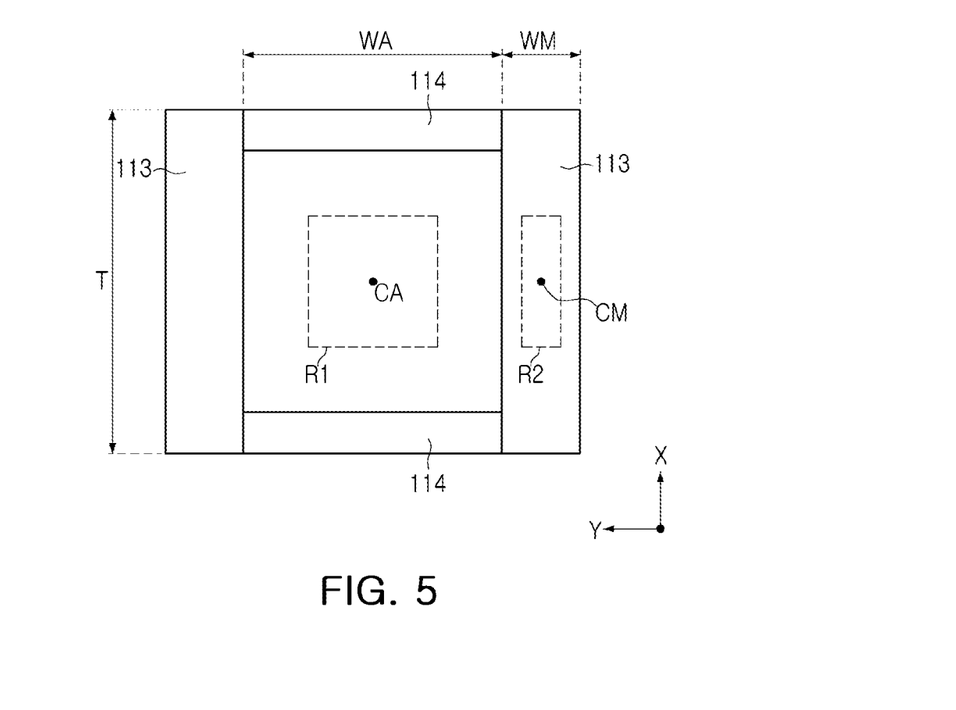
FIG. 5 is a subdivided view of a body region in FIG. 4.
Figure 6:
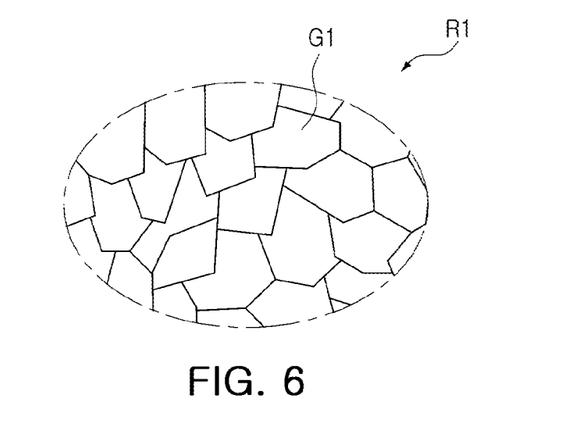
FIGS. 6 and 7 illustrate a shape of a dielectric grain of each region of a body.
Figure 7:
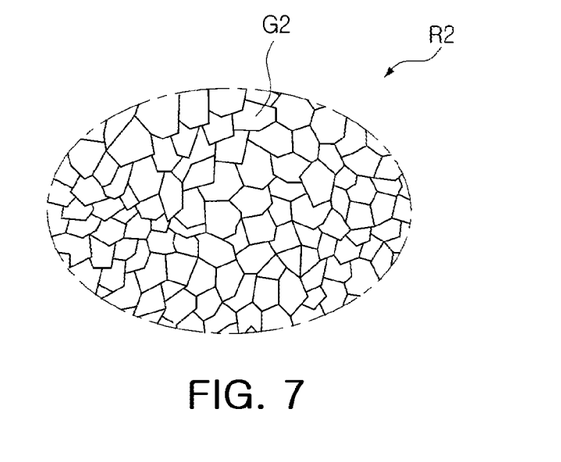
Figure 8:
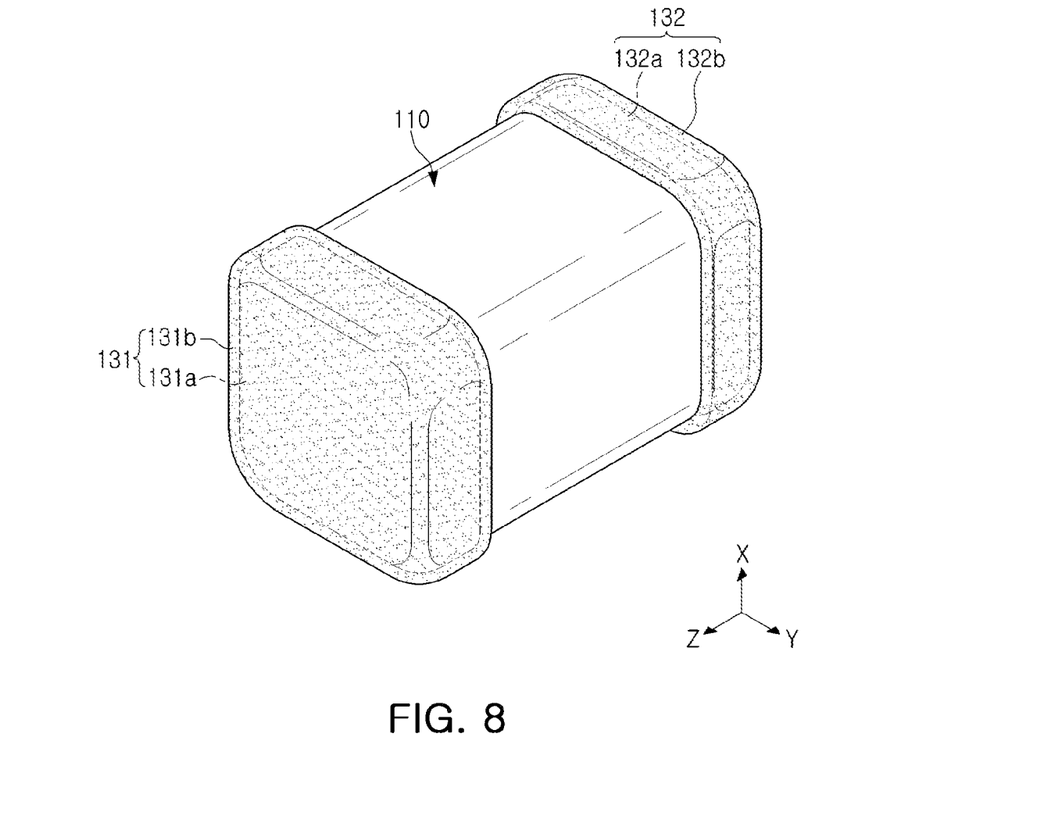
FIGS. 8 and 9 illustrate specific shapes of external electrodes that may be employed in the multilayer capacitor of FIG. 1.
Figure 9:
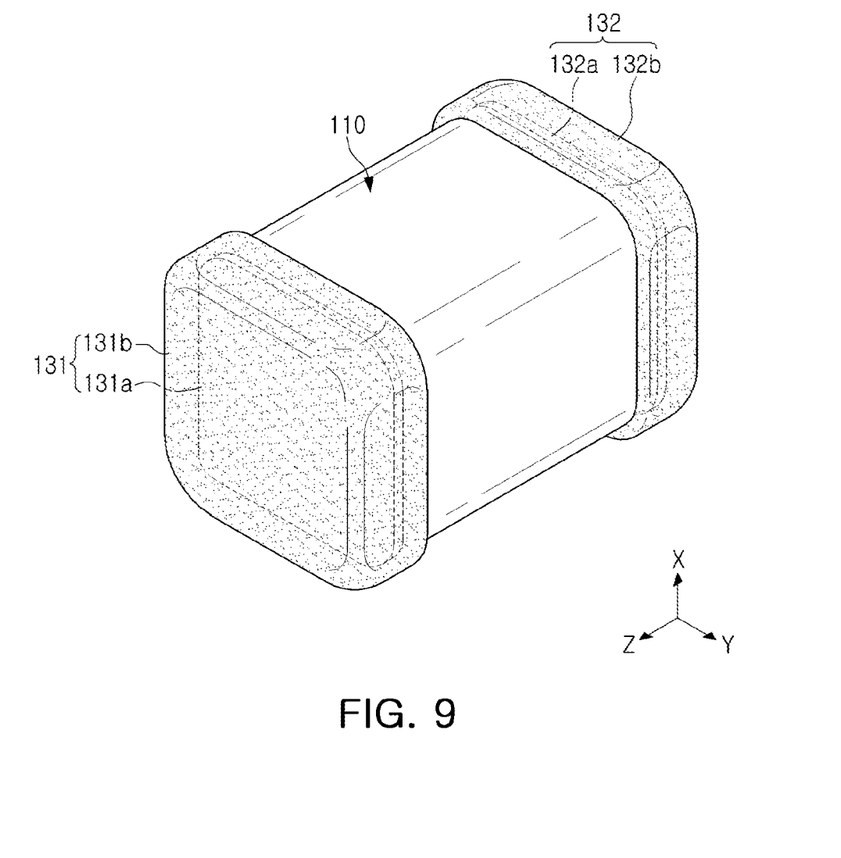

FIG. 1 is a perspective view schematically showing an appearance of a multilayer capacitor according to an exemplary embodiment in the present disclosure. FIG. 2 shows a shape of a body in the multilayer capacitor of FIG. 1. FIG. 3 is a cross-sectional view of the multilayer capacitor of FIG. 1, taken along line I-I'. FIG. 4 is a cross-sectional view of the multilayer capacitor of FIG. 1, taken along line FIG. 5 is a subdivided view of a body region in FIG. 4. FIGS. 6 and 7 illustrate a shape of a dielectric grain of each region of a body. FIGS. 8 and 9 illustrate specific shapes of external electrodes that may be employed in the multilayer capacitor of FIG. 1.

Referring to FIGS. 1 to 4, a multilayer capacitor 100 according to an exemplary embodiment in the present disclosure includes a body 110 including a dielectric layer 111 and a plurality of internal electrodes 121 and 122 stacked with the dielectric layer 111 interposed therebetween and external electrodes 131 and 132. An average grain size of the dielectric layer 111 is adjusted to be different in each region of the body 110. In addition, a side margin portion 113 of the body 110 includes an extending portion E covering portions of the internal electrodes 121 and 122.

The body 110 includes a multilayer structure in which a plurality of dielectric layers 111 are stacked in a first direction (X direction) and may be obtained, for example, by stacking a plurality of green sheets and then sintering the plurality of green sheets. Through the sintering process, the plurality of dielectric layers 111 may have an integrated form. The dielectric layer 111 included in the body 110 may include a ceramic material having a high dielectric constant, for example, BT-based, i.e., a barium titanate ($BaTiO_3$)-based ceramic, but other materials known in the art may also be used as long as sufficient capacitance is obtained. The dielectric layer 111 may further include an additive, an organic solvent, a plasticizer, a binder, and a dispersant, if necessary, along with such a ceramic material as a main ingredient. Here, the additive may include a metal component and may be added in the form of a metal oxide during a manufacturing process. An example of such a metal oxide additive may include at least one of $MnO_2$, $Dy_2O_3$, BaO, MgO, $Al_2O_3$, $SiO_2$, $Cr_2O_3$, and $CaCO_3$.

The plurality of internal electrodes 121 and 122 may be obtained by printing a paste containing a conductive metal to a predetermined thickness on one surface of a ceramic green sheet and then sintering the paste. In this case, as shown in FIG. 2, the plurality of internal electrodes 121 and 122 may include first and second internal electrodes 121 and 122 exposed in the third direction (Z direction) of the body 110 opposing each other. Here, when a direction in which a first surface S1 and a second surface S2 of an active portion 112 of the body 110 oppose each other, i.e., a direction perpendicular to the first surface S1 and the second surface S2, is referred to as the second direction (Y direction), the third direction (Z direction) may be a direction perpendicular to the first direction (X direction) and the second direction (Y direction). The first and second internal electrodes 121 and 122 may be connected to different external electrodes 131 and 132 to have opposite polarities when driven, and may be electrically separated from each other by a dielectric layer 111 disposed therebetween. However, the number of the external electrodes 131 and 132 or a method for connecting the external electrodes with the internal electrodes 121 and 122 may vary according to exemplary embodiments. The main ingredient materials of the internal electrodes 121 and 122 may include nickel (Ni), copper (Cu), palladium (Pd), silver (Ag), and the like, and alloys thereof may also be used.

The external electrodes 131 and 132 may be formed outside the body 110 and may include first and second external electrodes 131 and 132 connected to the first and second internal electrodes 121 and 122, respectively. The external electrodes 131 and 132 may be formed by a method of preparing a material containing a conductive metal as a paste and then applying the paste to the body 110. Examples of the conductive metal include nickel (Ni), copper (Cu), palladium (Pd), gold (Au), or alloys thereof. Here, the external electrodes 131 and 132 may further include a plating layer including Ni, Sn, or the like. As in the specific examples shown in FIGS. 8 and 9, the external electrodes 131 and 132 may have a multilayer structure. In the exemplary embodiment of FIG. 8, first layers 131a and 132a are formed as underlayers on surfaces of the body 110 to which the internal electrodes 121 and 122 are exposed, and extend to the upper and lower surfaces of the body 110. The first layers 131a and 132a may be formed by forming a material containing a conductive metal as a paste and then applying the paste to the body 110 or dipping the body 110 into the conductive paste. Examples of the conductive metal include nickel (Ni), copper (Cu), palladium (Pd), gold (Au), or an alloy thereof. Second layers 131b and 132b disposed on the first layers 131a and 132a may include a plating layer, may include Ni, Sn, or the like, and may be implemented in a multilayer structure. The exemplary embodiment of FIG. 9 has a structure in which the first layers 131a and 132a are formed only on the surfaces of the body 110 to which the internal electrodes 121 and 122 are exposed and may be obtained by attaching the first layers 131a and 132a to the body 110 through a transfer process.

In the present exemplary embodiment, the body 110 includes an active portion 112 in which a plurality of internal electrodes 121 and 122 are located to form capacitance and a side margin portion 113 covering a first surface S1 and a second surface S2 of the active portion opposing each other. In this case, the first surface S1 and the second surface S2 may oppose in a second direction (Y direction) perpendicular to the first direction (X direction). In addition, the body 110 may further include a cover part 114 covering the active portion 112 in the first direction (X direction). Here, the cover part 114 may be formed by stacking ceramic green sheets for forming the dielectric layer 111 included in the active portion 112, and if necessary, a ceramic green sheet having a composition, a particle size distribution, and a binder content different from those for forming the dielectric layer 111 included in the active portion 112 may be used.

In the case of the present exemplary embodiment, an average grain sizes of the dielectric layer 111 is different in each region of the body 110, and specifically, the average grain size of the dielectric layer 111 included in the active portion 112 is greater than the average grain size of the dielectric layer included in the side margin portion. A condition for the grain sizes may be implemented by adjusting a particle size distribution, a binder content, a Ba/Ti molar ratio, etc. of ceramic particles in the active portion 112 and the side margin portion 113 before sintering. The side margin portion 113 may have different characteristics from the active portion 112 in order to perform moisture resistance protection or structural stability functions, and to this end, in the present exemplary embodiment, the average grain sizes of the dielectric layers 111 in the side margin portion 113 and the active portion 112 are adjusted to be different. In this case, as shown in FIGS. 6 and 7, the grains G1 included in the dielectric layer 111 of the active portion 112 may have an average grain size greater than the average grain size of the grains G2 included in the dielectric layer 111 included in the side margin portion 113. Based on this shape, the side margin portion 113 may have a compact structure, thus having improved moisture resistance reliability and the like.

Referring to FIG. 5, a method of measuring a grain size will be described. FIG. 5 shows the body in FIG. 4 divided by regions, in which internal electrodes are not shown. FIGS. 6 and 7 illustrate the shapes of dielectric grains in the active portion and the side margin portion, respectively. As an example of a method of measuring the grain size of the dielectric layer 111, the average grain size of the dielectric layer 111 may be measured using, for example, scanning electron microscopy (SEM), etc., based on a cut surface of the body 110 cut in the first direction (X direction) and the second direction (Y direction). In this case, the cut surface may be a surface cut in a central portion of the body 110 in the third direction (Z direction), but the location of the cut surface is not limited thereto. In addition, one of ordinary skill in the art may select the cut surface at other locations in the body 110, if needed.

The average grain size of the dielectric layer 111 included in the active portion 112 may be an average size of grains present in a first rectangle R1 including a center point CA of the active portion 112 in the cut plane and having a length which is a half of a length T of the body 110 in the first direction (X direction) and a width which is a half of a length WA of the active portion 112 in the second direction (Y direction). In addition, the average grain size of the dielectric layer 111 included in the side margin portion 113 may be an average size of grains present in a second rectangle R2 including a center point CM of the side margin portion 113 in the cut plane and having a length equal to half the length T of the body 110 in the first direction (X direction) and a width which is a half of a length WM of the side margin portion 113 in the second direction (Y direction).

Further, when measuring the sizes of the grains G1 and G2, a method of measuring the areas of the grains G1 and G2 and converting the measured areas into circle-equivalent diameters or the like. Also, in order to increase accuracy of measurement, only the grains G1 and G2 in which the entire area is surrounded by grain boundaries in the reference rectangles R1 and R2 may be selected, but the method of measuring the grain size is not limited thereto.

As a configuration for further improving the moisture resistance reliability, the side margin portion 113 includes an extending portion E extending between the external electrodes 131 and 132 and the internal electrodes 121 and 122 to cover portions of the internal electrodes 121 and 122. Due to the extending portion E, a width W2 of the exposed regions of the internal electrodes 121 and 122 is narrowed from a width WA of the active portion 112 measured from the first surface S1 to the second surface S2 of the active portion 112, to have a structure similar to a bottleneck. For example, the width of the internal electrodes 121 and 122 may be gradually reduced from W1 to W2 at an end portion of the body 110, forming a bottleneck shape, as the extending portion E covers corner portions of the internal electrodes 121 and 122, but not limited thereto. The external electrodes 131 and 132 may be disposed on the end portion of the body 110 to be connected to the exposed regions of the internal electrodes 121 and 122. Employment of the extending portion E may obtain an effect that the internal electrodes 121 and 122 are disposed relatively far from the edge of the body 110 which is vulnerable to external influences such as a plating solution, moisture, etc., thereby improving the moisture resistance reliability. In this case, the extending portion E, as a part of the side margin portion 113, may form a structure integrated with the other regions of the side margin portion 113. Accordingly, the condition of the dielectric grain size described above may also be applied to the extending portion E. That is, the average grain size of the dielectric layer 111 included in the extending portion E may be smaller than the average grain size of the dielectric layer 111 included in the active portion 112. In addition, a thickness t1 of the extending portion E may be substantially the same as a thickness t2 of the remaining regions of the side margin portion 113, and here, the thickness t1 of the extending portion E may be a thickness measured in the third direction (Z direction) and the thickness t2 of the remaining regions of the side margin portion 113 may be a thickness measured in the second direction (Y direction).

As will be described later, the extending portion (E) may be formed in a manner of attaching the side margin portion 113 to the first surface S1 and the second surface S2 of the active portion 112, and in this case, the side margin portion 113 may not cover a third surface S3 and a fourth surface S4 opposing in the direction in which the plurality of dielectric layers 111 are stacked, i.e., in the first direction (X direction) in the body 110. This shape may be obtained by forming a length of the side margin portion 113 in the first direction (X direction) to be equal to a length T of the body 110 in the first direction (X direction).

As illustrated, lengths W2 of the exposed region of the plurality of internal electrodes 121 and 122, not covered by the extending portion E, may be substantially uniform in the direction in which the first surface S1 and the second surface S2 oppose each other, i.e., in the second direction (Y direction). This shape may be obtained by forming the length of the extending portion E in the second direction (Y direction) to be uniform. When the length W2 of the exposed region of the plurality of internal electrodes 121 and 122 are uniform, the multilayer capacitor 100 may be uniform electrical characteristics and may be stably driven. In this case, in order to sufficiently secure regions in which the internal electrodes 121 and 122 and the external electrodes 131 and 132 are in contact with each other, the length of the extending portion E may be adjusted such that the length W2 of the exposed region of the internal electrodes 121 and 122 is 50% or greater of the length W1 of the body 110 with reference to the second direction (Y direction) in which the first and second surfaces S1 and S2 oppose each other.

Herein, one or ordinary skill in the art would understand that the expression "substantially the same" or "substantially uniform" refers to being the same or uniform by allowing process errors, positional deviations, and/or measurement errors that may occur in a manufacturing process.

Further, the condition for the dielectric grain size described in the exemplary embodiment described above, that is, the condition in which the average grain size of the dielectric layer 111 included in the active portion 112 is greater than the average grain size of the dielectric layer 111 included in the side margin portion 113 may not be essential and may be excluded in a modification. In the modification excluding the condition for the dielectric grain size, the side margin portion 113 may not cover the third surface S3 and the fourth surface S4 opposing in the direction in which the plurality of dielectric layers 111 are stacked, i.e., in the first direction (X direction), in the body 110, and this modification may also be a structure intended in the present embodiment.

Figure 10:
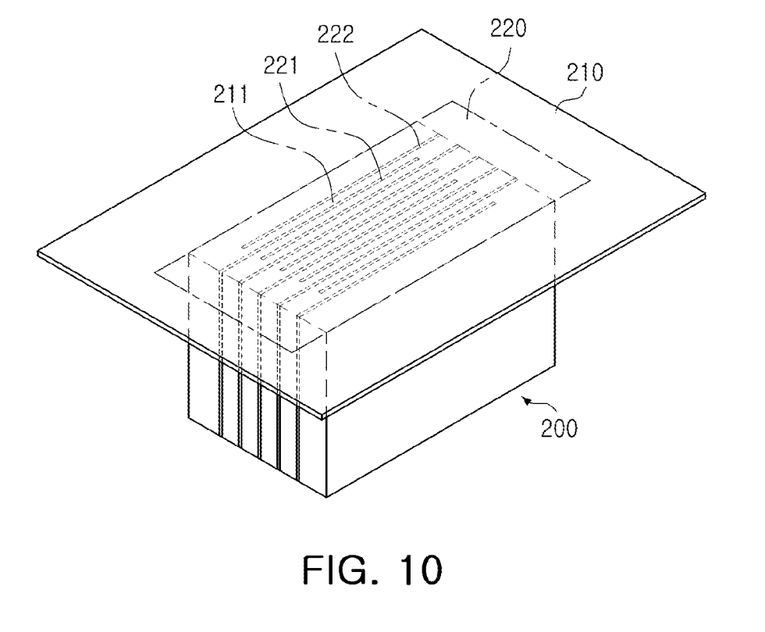
FIGS. 10 to 12 illustrate a process of forming a side margin portion as part of a process of manufacturing a multilayer capacitor according to an exemplary embodiment in the present disclosure.
Figure 11:
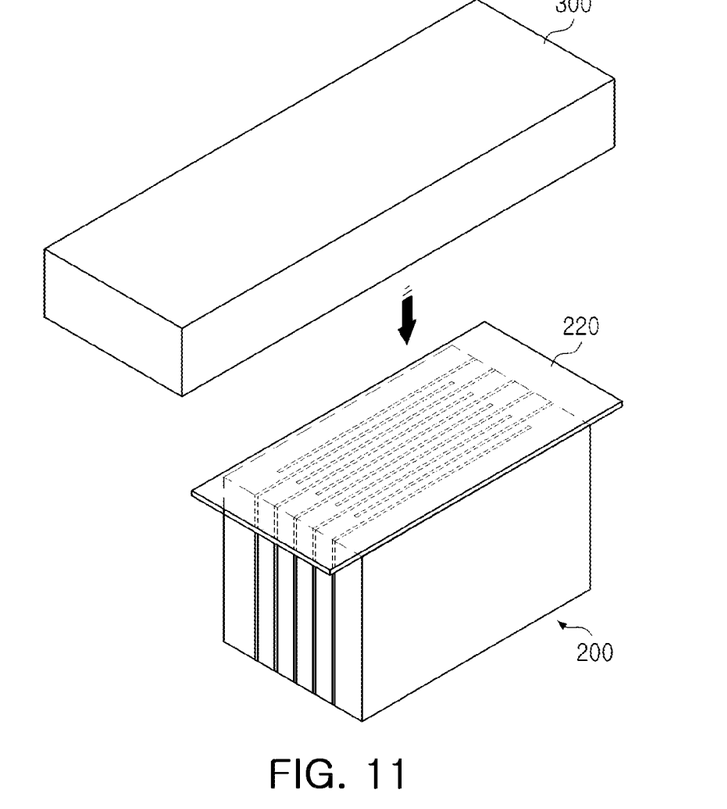
Figure 12:
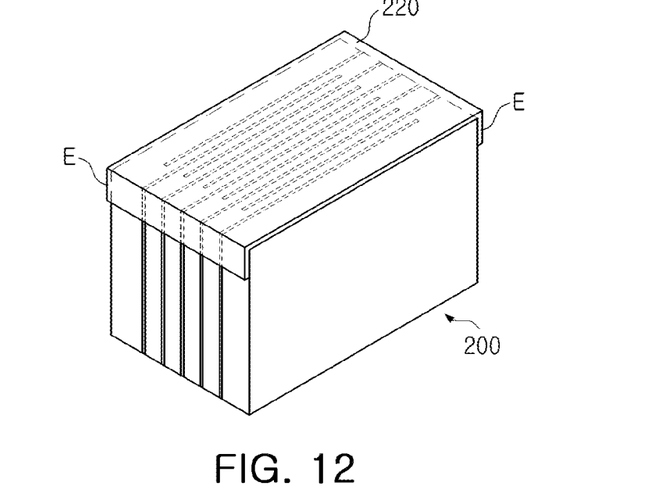

FIGS. 10 to 12 illustrate a process of forming a side margin portion as a part of a process of manufacturing a multilayer capacitor according to an exemplary embodiment in the present disclosure. As a step for forming the body 110, first, a multilayer 200 is provided. The multilayer 200 may be obtained by stacking a ceramic green sheet 211 and conductive pastes 221 and 222 for internal electrodes. In this case, a slurry may be prepared by mixing ceramic powder, a binder, a solvent, etc. and forming a sheet having a thickness of several μm or less than 1 μm with the slurry by a doctor blade method, etc., to thus form the ceramic green sheet 211. Conductive pastes 221 and 222 for internal electrodes may be applied to the ceramic green sheet 211 using, for example, a screen printing method or a gravure printing method.

A ceramic green sheet 210 is disposed on a surface (an upper surface in FIG. 10) to which the conductive pastes 221 and 222 are exposed, and cut according to a size of the multilayer 200 to form a sheet 220 for side margin portion. Here, the conductive pastes 221 and 222 may be exposed when the multilayer 200 is cut in units of parts. In addition, the sheet 220 for side margin portion may have characteristics different from the ceramic green sheet 211 included in the multilayer 200, and as described above, a particle size distribution, a binder content, a Ba/Ti molar ratio, etc, of the ceramic particles may be different. In addition, the sheet 220 for side margin portion may be manufactured to be longer than the multilayer 200 in one direction, and accordingly, the extending portion may partially cover the exposed regions of the conductive pastes 221 and 222.

After disposing the sheet 220 for side margin portion on the multilayer 200, the sheet 220 for side margin portion is attached to the multilayer 200 by a pressing means 300 such as rubber 200 or the like as shown in FIG. 11. As shown in FIG. 12, in this process, a part of the sheet 220 for side margin portion covers a part of the exposed regions of the conductive pastes 221 and 222 in the form of an extending portion B. In addition, the processes of FIGS. 11 and 12 may be performed on the opposite side of the multilayer 200. Thereafter, the multilayer 200 may be fired and external electrodes are formed, thereby completing a multilayer capacitor.

As set forth above, the multilayer capacitor according to exemplary embodiments of the present disclosure may have improved reliability (moisture resistance reliability) against external influences.

While exemplary embodiments have been shown and described above, it will be apparent to those skilled in the art that modifications and variations could be made without departing from the scope of the present disclosure as defined by the appended claims.

What is claimed is:
1. A multilayer capacitor comprising:
a body including a multilayer structure in which a plurality of dielectric layers are stacked, and further including a plurality of internal electrodes having a dielectric layer interposed therebetween; and
external electrodes disposed on respective external surfaces of the body through which the external electrodes are connected to the internal electrodes,
wherein the body further includes an active portion in which the plurality of internal electrodes are located to form capacitance and a side margin portion covering a first surface and a second surface of the active portion opposing each other,
an average grain size of a dielectric layer included in the active portion is different from an average grain size of a dielectric layer included in the side margin portion, and
the side margin portion includes an extending portion disposed on the respective external surfaces so as to be arranged between the external electrodes and the internal electrodes to cover a portion of the internal electrodes.

2. The multilayer capacitor of claim 1, wherein
the average grain size of the dielectric layer included in the active portion is larger than the average grain size of the dielectric layer included in the side margin portion.

3. The multilayer capacitor of claim 1, wherein
the side margin portion does not cover two surfaces of the body opposing in a direction in which the plurality of dielectric layers are stacked.

4. The multilayer capacitor of claim 1, wherein
lengths of exposed regions of the plurality of internal electrodes not covered by the extending portion are substantially uniform in a direction in which the first and second surfaces of the active portion oppose each other.

5. The multilayer capacitor of claim 4, wherein
each length of the exposed regions is 50% or greater of a length of the body in a direction in which the first and second surfaces of the active portion oppose each other.

6. The multilayer capacitor of claim 1, wherein
a direction in which the plurality of dielectric layers are stacked is a first direction and a direction in which the first and second surfaces oppose is a second direction, and the internal electrodes are exposed from the body and connected to the external electrodes in a third direction perpendicular to the first direction and the second direction.

7. The multilayer capacitor of claim 6, wherein,
based on a cut surface of the body cut in the first and second directions, the average grain size of the dielectric layer included in the active portion is an average size of grains present in a first rectangle including a center point of the active portion in the cut surface and having a length equal to half a length of the body in the first direction and a width equal to half a length of the active portion in the second direction.

8. The multilayer capacitor of claim 7, wherein
the average grain size of the dielectric layer included in the side margin portion is an average size of grains present in a second rectangle including a center point of the side margin portion in the cut surface and having a length equal to half a length of the side margin portion in the first direction and a width equal to half a length of the side margin portion in the second direction.

9. The multilayer capacitor of claim 6, wherein
the external electrodes each include a first layer in contact with the internal electrode and a second layer covering the first layer.

10. The multilayer capacitor of claim 9, wherein
the first layer of each of the external electrodes covers a surface of the body to which the internal electrodes are exposed and extends to cover the side margin portion and two surfaces of the body opposing in a direction in which the plurality of dielectric layers are stacked.

11. The multilayer capacitor of claim 9, wherein
the first layers of the external electrodes respectively cover the external surfaces of the body to which the internal electrodes are exposed and do not cover surfaces of the body other than the external surfaces of the body.

12. The multilayer capacitor of claim 1, wherein
the average grain size of the dielectric layer included in the extending portion of the side margin portion is smaller than the average grain size of the dielectric layer included in the active portion.

13. The multilayer capacitor of claim 1, wherein
a thickness of the extending portion in a direction in which the internal electrodes are exposed from the body is substantially the same as a thickness of remaining regions of the side margin portion in a direction in which the first and second surfaces of the active portion oppose each other.

14. A multilayer capacitor comprising:
a body including a multilayer structure in which a plurality of dielectric layers are stacked, and further including a plurality of internal electrodes having a dielectric layer interposed therebetween; and
external electrodes disposed on respective external surfaces of the body through which the external electrodes are connected to the internal electrodes,
wherein the body further includes an active portion in which the plurality of internal electrodes are located to form capacitance and a side margin portion covering a first surface and a second surface of the active portion opposing each other,
the side margin portion includes an extending portion disposed on the respective external surfaces so as to be arranged between the external electrodes and the internal electrodes to cover a portion of the internal electrodes, and
two surfaces of the body opposing in a direction in which the plurality of dielectric layers are stacked are free from the extending portion.

15. The multilayer capacitor of claim 14, wherein
lengths of exposed regions of the plurality of internal electrodes not covered by the extending portion are substantially uniform in a direction in which the first and second surfaces of the active portion oppose each other.

16. The multilayer capacitor of claim 14, wherein
an average grain size of a dielectric layer included in the active portion is larger than an average grain size of a dielectric layer included in the side margin portion.

17. The multilayer capacitor of claim 14, wherein
an average grain size of a dielectric layer included in the extending portion of the side margin portion is smaller than an average grain size of a dielectric layer included in the active portion.

18. The multilayer capacitor of claim 17, wherein
lengths of exposed regions of the plurality of internal electrodes not covered by the extending portion are substantially uniform in a direction in which the first and second surfaces of the active portion oppose each other.

19. The multilayer capacitor of claim 18, wherein
the lengths of the exposed regions of the plurality of internal electrodes are narrowed from a width of the active portion measured from the first surface to the second surface of the active portion.

* * * * *